United States Patent
Bon

(10) Patent No.: US 6,659,532 B2
(45) Date of Patent: Dec. 9, 2003

(54) RELEASABLE LINKING UNIT AND CORRESPONDING MOTOR VEHICLE

(75) Inventor: Benoît Bon, Crespieres (FR)

(73) Assignee: Wagon Automotive SA, Poissy (FR)

( * ) Notice: Subject to any disclaimer, the term of this patent is extended or adjusted under 35 U.S.C. 154(b) by 0 days.

(21) Appl. No.: 10/236,974

(22) Filed: Sep. 9, 2002

(65) Prior Publication Data

US 2003/0047960 A1 Mar. 13, 2003

(30) Foreign Application Priority Data

Sep. 13, 2001 (FR) .............................. 01 11876

(51) Int. Cl.⁷ ............................................... B62D 25/06
(52) U.S. Cl. ....................................... 296/102; 296/121
(58) Field of Search ................................ 296/102, 103, 296/121, 224, 218, 107.08, 76, 136; 49/465; 248/237, 503; 135/140

(56) References Cited

U.S. PATENT DOCUMENTS

| | | | | |
|---|---|---|---|---|
| 730,186 A | * | 6/1903 | Case ........................... | 296/121 |
| 3,266,838 A | * | 8/1966 | Heincelman ................ | 296/121 |
| 3,342,525 A | * | 9/1967 | Griffin ........................ | 296/121 |
| 3,789,645 A | * | 2/1974 | Schmid ....................... | 296/224 |
| 4,238,876 A | * | 12/1980 | Monroe et al. ............. | 296/102 |
| 4,394,044 A | * | 7/1983 | Hough et al. ............... | 296/218 |
| 4,813,585 A | * | 3/1989 | Nutt ............................ | 224/324 |
| 4,817,999 A | * | 4/1989 | Drew .......................... | 296/121 |
| 4,830,425 A | * | 5/1989 | Muscat ....................... | 296/121 |
| 4,884,843 A | * | 12/1989 | DeRees ...................... | 297/331 |
| 4,913,478 A | * | 4/1990 | Grossman ............... | 292/259 R |
| 5,154,479 A | * | 10/1992 | Sautter, Jr. .................. | 296/121 |
| 5,186,588 A | * | 2/1993 | Sutton et al. ............... | 410/120 |
| 5,284,378 A | * | 2/1994 | Sautter, Jr. .................. | 296/121 |
| 5,413,390 A | * | 5/1995 | Filippi ........................ | 296/121 |
| 5,435,615 A | * | 7/1995 | Schmitz ..................... | 296/121 |
| 5,839,778 A | * | 11/1998 | Schaible et al. ............ | 296/121 |
| 5,957,511 A | * | 9/1999 | Homann et al. ............ | 296/196 |
| 5,984,382 A | * | 11/1999 | Bourne et al. .............. | 292/113 |
| 5,992,917 A | * | 11/1999 | Hilliard et al. ............. | 296/121 |
| 6,139,235 A | * | 10/2000 | Vander Koy et al. ....... | 410/111 |
| 6,224,132 B1 | * | 5/2001 | Neale ........................ | 296/68.1 |
| 6,227,581 B1 | * | 5/2001 | Lambert .................... | 292/200 |
| 6,283,531 B1 | * | 9/2001 | Tanigawa et al. .......... | 296/103 |
| 6,520,560 B2 | * | 2/2003 | Schutt et al. ............... | 296/121 |
| 6,568,495 B1 | * | 5/2003 | Corder et al. ................ | 296/76 |

FOREIGN PATENT DOCUMENTS

| | | | |
|---|---|---|---|
| EP | 0 049 983 | * | 4/1982 |
| EP | 0 430 425 | * | 6/1991 |
| EP | 0 566 061 | | 10/1993 |
| GB | 2 267 063 | * | 11/1993 |
| JP | 4 230420 | * | 8/1992 |

* cited by examiner

Primary Examiner—Kiran Patel
(74) Attorney, Agent, or Firm—Young & Thompson

(57) ABSTRACT

A releasable linking unit has first and second support elements designed to be applied one against the other, said first support element having a catch loop; a hook joined to said second support element and displaceable relative to this second support element; control members having elements for guiding the hook between a locked position and an unlocked position. The guide elements are designed to bias the two support elements one against the other when the hook is fully displaced from its intermediate position into its locked position.

16 Claims, 5 Drawing Sheets

RELEASABLE LINKING UNIT AND CORRESPONDING MOTOR VEHICLE

TECHNICAL FIELD

The present invention relates to a releasable linking unit of the type outlined in the generic part of claim 1.

BACKGROUND TO THE INVENTION

In convertible motor vehicles, the roof is either articulated on a rear part of the vehicle frame or removably fixed to the frame.

In the case of vehicles with a removable roof, the link between the roof and frame is difficult to manipulate and not very strong.

The objective of the invention is to alleviate this problem and propose a device that will provide a strong link between a part of a removable roof and the vehicle frame.

SUMMARY OF THE INVENTION

To this end, the invention relates to a unit of the above-mentioned type, characterised by the features defined in claim 1.

Specific embodiments of the invention incorporate one or more of the features specified in sub-claims 2 to 15.

The invention further relates to a motor vehicle comprising a frame and a removable roof arch, characterised by the fact that the roof arch is linked to the frame by means of a linking unit of the type defined above.

DESCRIPTION OF DRAWINGS

The invention will be more readily understood from reading the description below, which is given solely by way of example, and with reference to the appended drawings, of which:

FIG. 1A shows detail IA from FIG. 1, on a larger scale;

DESCRIPTION OF PREFERRED EMBODIMENT

Figure 1:
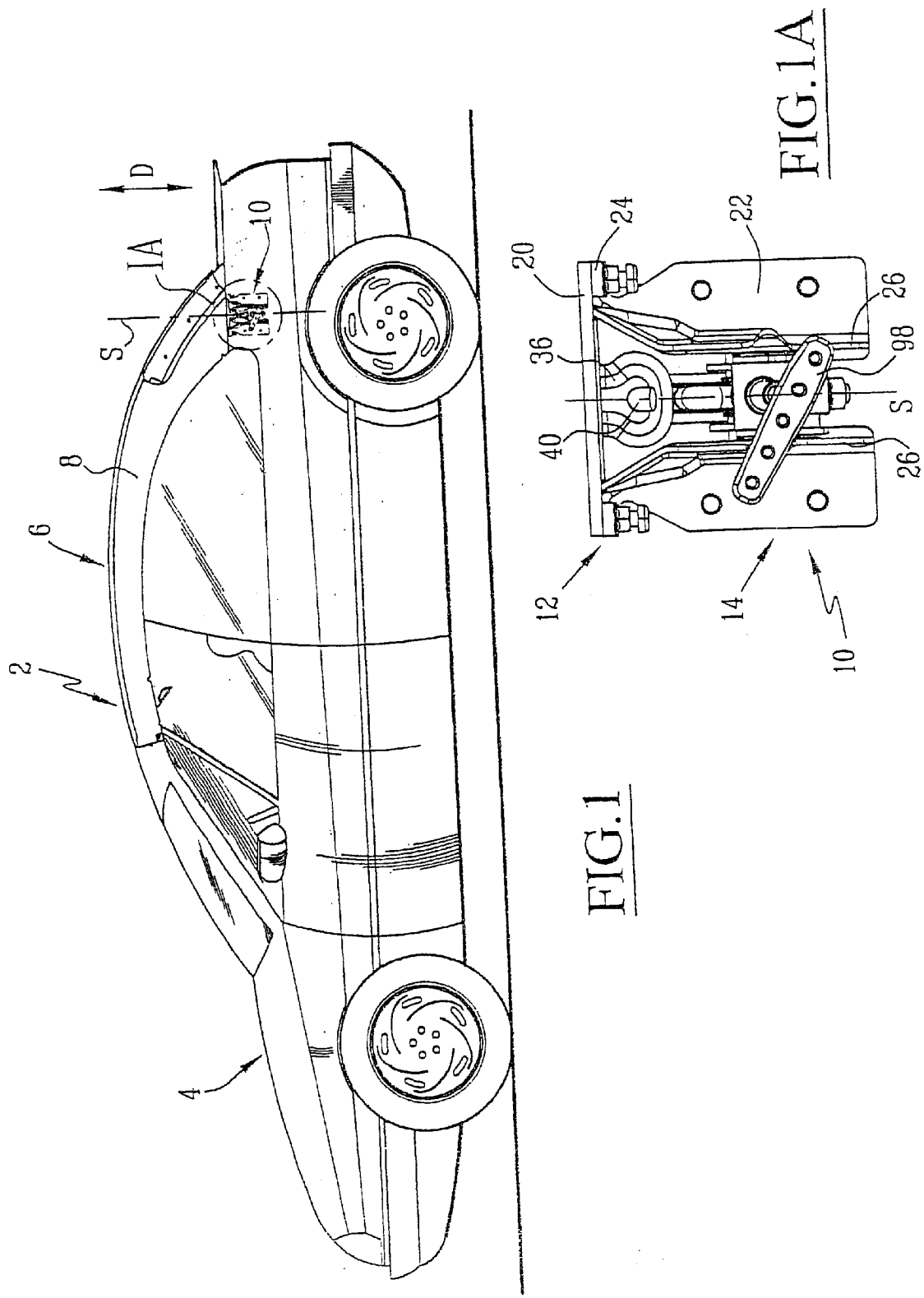
FIG. 1 is a schematic side view of a motor vehicle incorporating a unit as proposed by the invention.

FIG. 1 illustrates a motor vehicle 2, comprising a frame 4 and a roof 6. The terms "front" and "rear" below are used by reference to the vehicle's normal direction of travel.

The roof 6 comprises two roof arches 8, right and left, the left arch being visible in FIG. 1. The arches 8 are laterally disposed on either side of the vehicle and extend from the windshield towards a part located between the rear seat and the trunk. At the rear, each of the two arches 8 is linked to the frame 4 by a linking unit 10. The arches 8 are fixed to the frame 4 so as to be releasable, i.e. when the roof is not wanted, the roof 6 may be detached and completely removed from the frame 4 by means of the two linking units 10.

Figure 2:
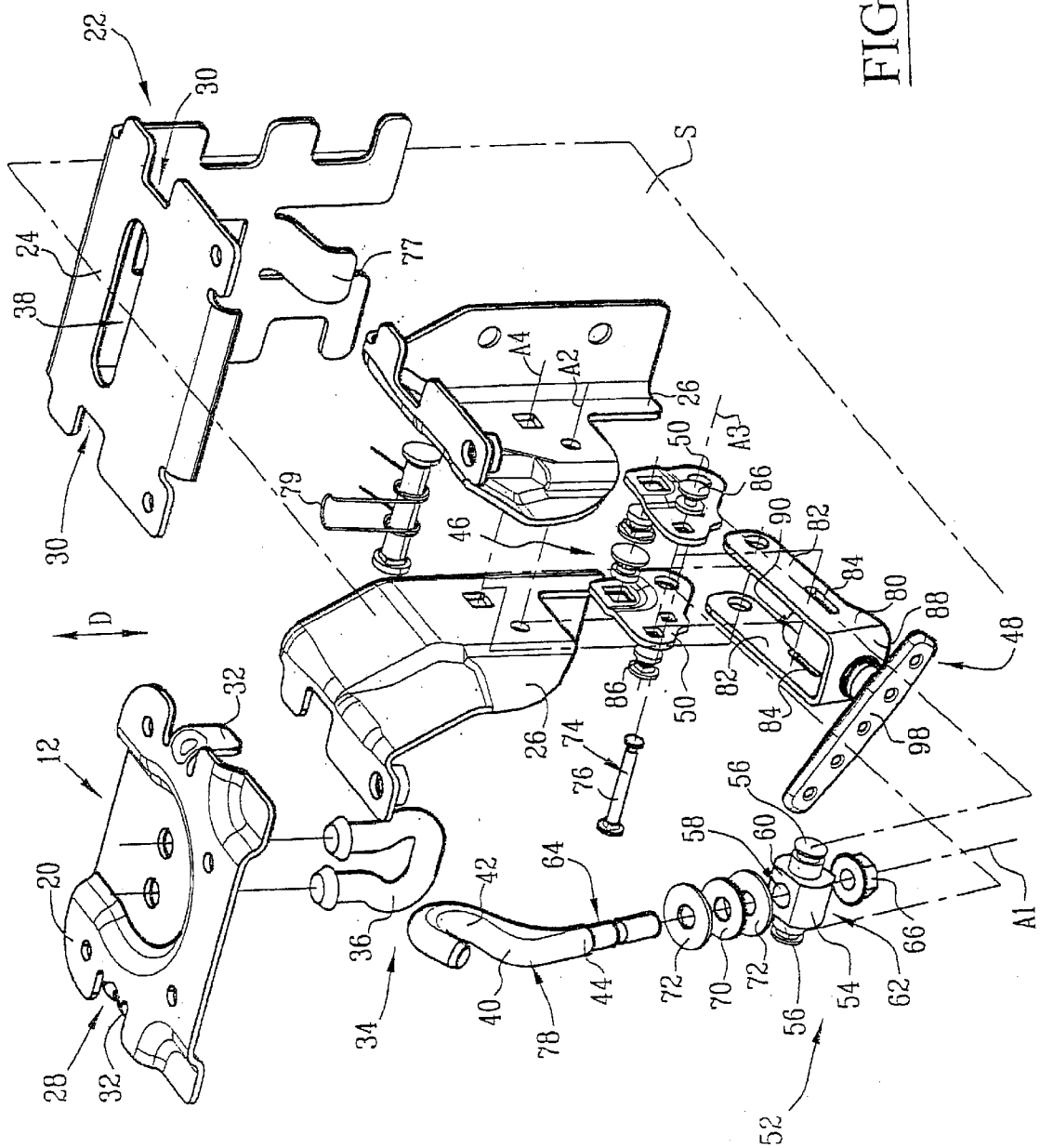
FIG. 2 is an exploded perspective view of the linking unit proposed by the invention.

The linking unit 10 is illustrated in more detail in FIG. 2.

As may be seen from FIG. 1A, the unit 10 is substantially symmetrical relative to a plane of symmetry S disposed transversely to the vehicle in the assembled state.

The terms "side" and "central" are used by reference to this plane S.

The linking unit 10 has two complementary fittings or braces 12, 14. The first fitting 12 is a mounting plate 20 fixed to the roof arch 8 and the second fitting 14 constitutes a casing 22 fixed to the frame 4 of the vehicle and has a horizontal bedding plate 24 for the plate 20. The casing additionally has two mutually parallel side walls 26 which extend parallel with the plane S.

When the roof arch 8 is being fitted or removed, the mounting plate 20 is displaceable in a direction of vertical displacement D relative to the bedding plate 24 (see FIG. 1).

The mounting plate 20 and the bedding plate 24 have complementary positioning means 28, illustrated in FIG. 2. These positioning means 28 are provided in the form of side notches 30 provided in the bedding plate 24 and side tabs 32 borne by the mounting plate 20 and designed to engage in the notches 30. The tabs 32 are integrally cast with the mounting plate 20 and extend in a flange arrangement parallel with the plane of symmetry S.

The linking unit 10 additionally has means 34 for linking and locking the two fittings 12, 14 when the roof arch 8 is linked to the frame 4. The locking means 34 has a catch element in the form of an eyelet 36 forming a loop. This eyelet 36 is a U-shaped iron bar fixed to the central part of the mounting plate 20. When the roof arch 8 is in the mounted position, the eyelet 36 extends down vertically through an opening 38 provided in the bedding plate 24.

Figure 3:
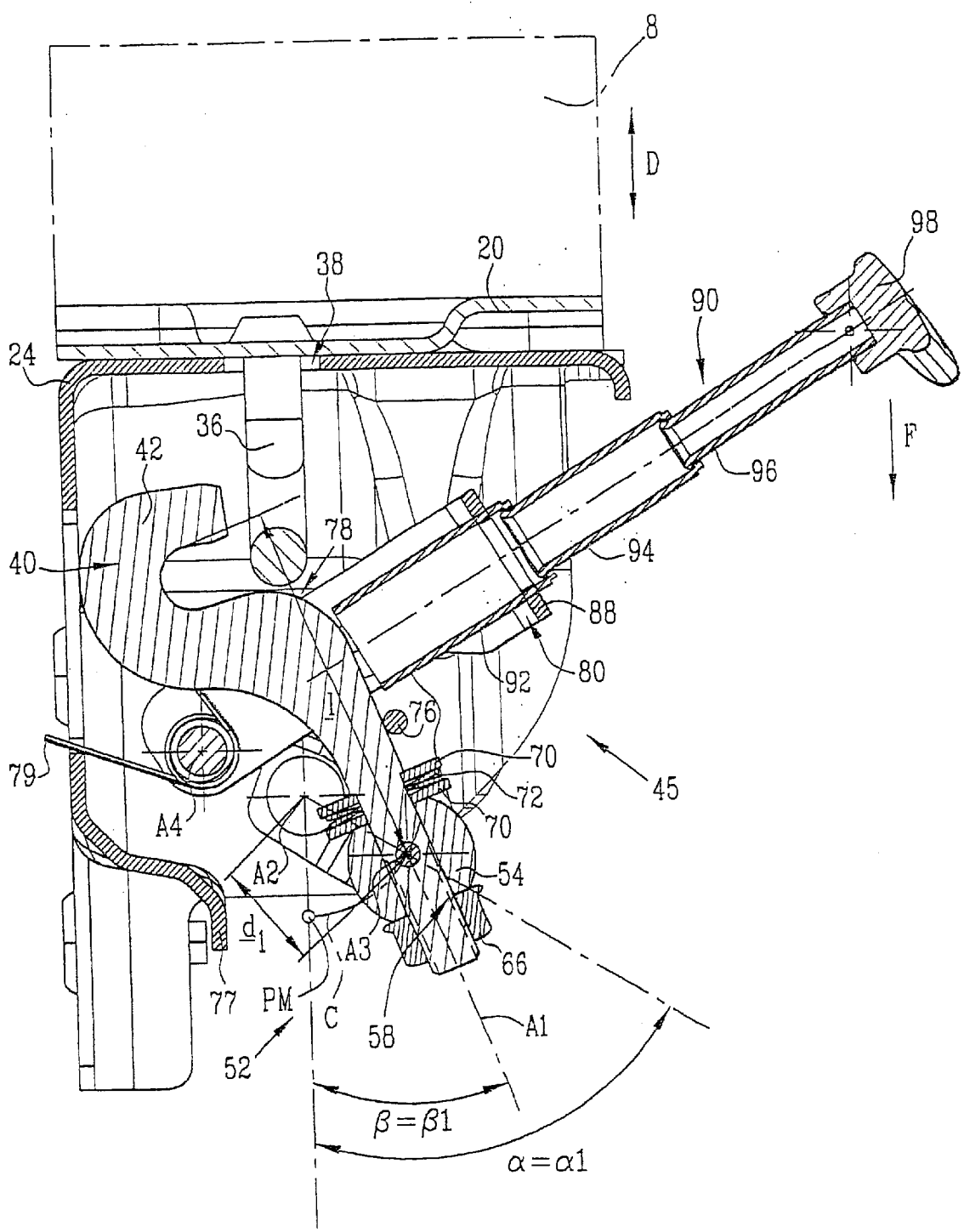
FIG. 3 is a view in section through the unit illustrated in FIG. 2, in the unlocked state.

The locking means 34 additionally has a hook 40 joined to the casing 22 and displaceable relative thereto. The hook 40 is formed by a crook-shaped portion 42 and a cylindrical extension 44 having a first axis A1. The hook 40 is displaceable in the plane S relative to the casing 22 between an unlocked position, as illustrated in FIG. 3, in which the mounting plate 20 can be placed on or removed from the bedding plate 24 in the direction of displacement D, an intermediate position illustrated in FIG. 4 and a position locking the mounting plate 20 on the bedding plate 24 and illustrated in FIG. 5.

Means 45 are also provided for controlling the hook 40. These control means 45 have means 46 for guiding the hook 40 between its locked and unlocked positions and means 48 for driving the hook 40 between these two positions.

The means 46 for guiding the hook have two links 50 or connecting rods parallel with the plane S. These links 50 are mounted so as to articulate relative to the two side walls 26 about a second axis A2. This second axis A2 extends perpendicular to the plane S. The hook 40 is mounted so as to articulate relative to the links 50 about a third axis A3 by means of a device 52 for adjusting the radial position of the hook. The axis A3 extends parallel with the second axis A2 and is offset from it by a distance $d_1$ as illustrated in FIG. 3. This distance $d_1$ is significantly smaller than the length l of the hook.

The two axes A2 and A3 define a plane, which subtends an angle α with the direction D.

The axis A1 of the extension 44 subtends an angle β with the direction D.

The radial length l of the hook 40 relative to the third axis A3 is adjustable by means of the radial adjusting device 52. This device 52 has a hook bearing 54 which articulates relative to the links 50 about the axis A3 by means of two stubs 56 illustrated in FIG. 2. The hook bearing 54 has an orifice 58 perpendicular to the axis A3 and two parallel support surfaces 60, 62 extending parallel with the axis A3 on either side of this axis.

The cylindrical extension 44 extends through the orifice 58. Its end opposite the portion 42 is threaded. To the rear of the thread, the extension 44 additionally has a shoulder forming a lock stop of the hook 40. A nut 66 is screwed onto the thread and restricts the displacement of the hook 40 radially towards the exterior relative to the axis A3. Depending on its position on the extension 44, this nut 66 therefore defines the radial length l of the hook 40'. A resilient element is inserted between the hook 40 and the hook bearing 54. This element is provided in the form of two Belleville washers 70, for example, sandwiched between two washers 72, disposed between the shoulder 64 and the support surface 60 of the hook bearing. Consequently, the crook-shaped portion 42 of the hook 40 is resiliently biassed along the axis A1 of the cylindrical extension 44 away from the axis A2 whilst being free to move closer to the axis A3 under the axial biassing force applied to the hook 40 along the axis A1.

The means 46 for guiding the hook additionally have means 74 for stopping the hook, illustrated in FIG. 2. These stopping means 74 consist of a pin forming a stop 76 fixed between the two links 50. This pin 76 extends parallel with the axes A2 and A3 and, when the hook 40 is in the unlocked position (FIG. 3), restricts the tilting action of the latter towards its locked position. The stopping means 74 also have a stop in the form of a tab 77 integral with the casing 22. This tab 77 restricts the swivelling motion of the link 50 and defines the position of the link when the hook is in its locked position.

Furthermore, a surface forming a cam 78 is provided on the hook 40 between the extension 44 and the crook-shaped portion 42. The cam surface 78 is generally convex and is applied against the eyelet 36 between the intermediate position and a position close to the locking position of the hook 40 (see below).

A spring 79 is disposed between the casing 22 and the hook 40 and biases the latter towards its locked position.

Figure 5:
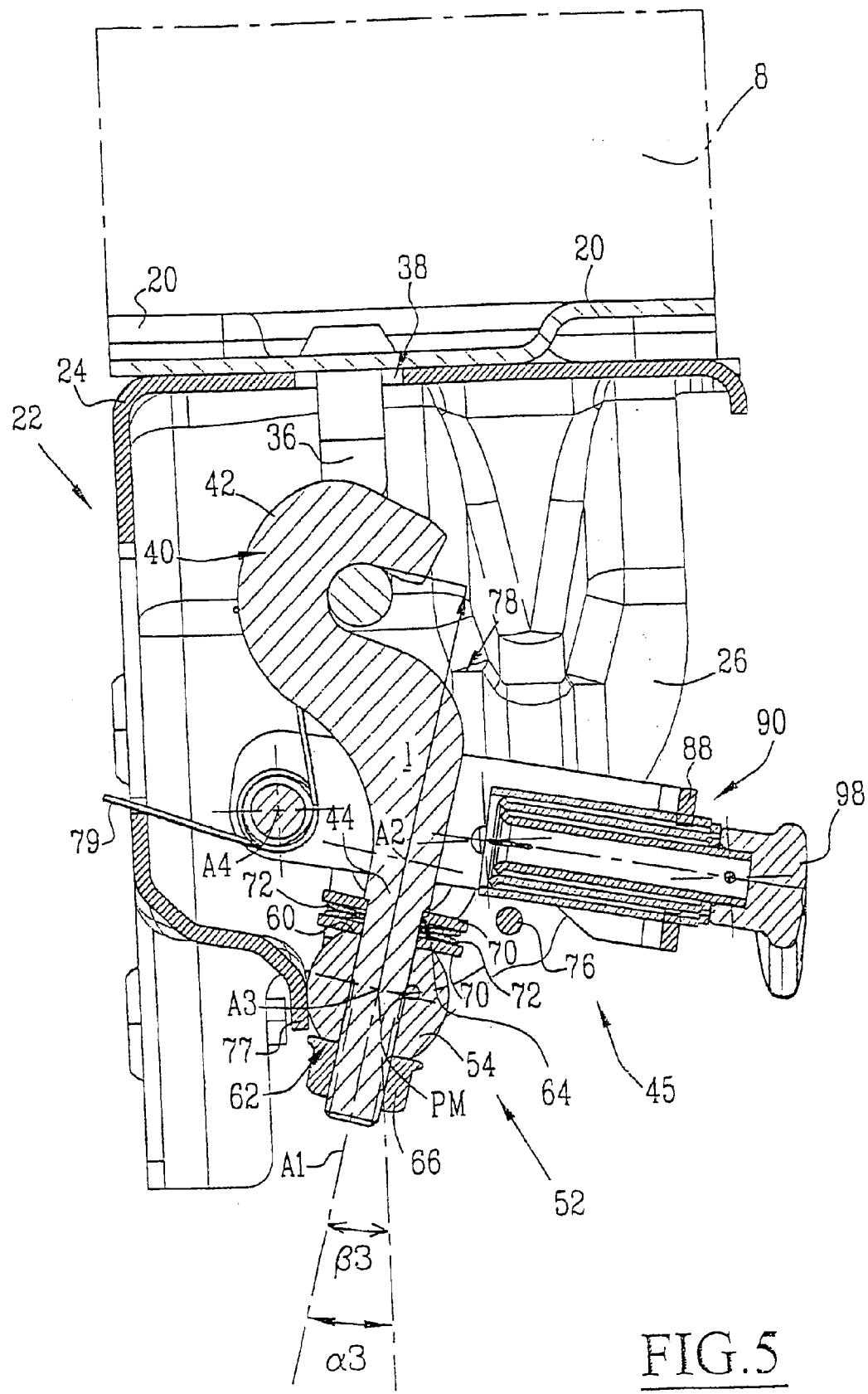
FIG. 5 is a view similar to that of FIG. 3, in which the unit is in the locked state.

The driving means 48 of the hook comprise a lever 80 mounted so as to articulate relative to the casing 22 about a fourth axis A4, which extends parallel with the second A2 and third A3 axes at a distance therefrom. The lever 80 is displaceable between an upper unlocked position (FIG. 3) and a lower locked position (FIG. 5). The lever 80 is a U-shaped piece, the side legs 82 of which extend parallel with the plane S. A guide aperture 84 is provided in each leg 82. Extending in these apertures are two pins 86 integral with the two links 50. A telescopic actuating arm 90 linking the two legs of the lever 80 is fixed to a base 88. This actuating arm 90 consists of three sleeves 92, 94, 96 of complementary diameters inserted one inside the other. A handle 98 is fixed to the free end of the arm 90.

The linking unit proposed by the invention operates in the following manner.

Initially, the unit 10 is in the unlocked configuration, illustrated in FIG. 3. The roof arch 8 has just been set in place. The mounting plate 20 is then placed on the bedding plate 24 and is positioned by means of the tabs 32 and the notches 30. The eyelet 36 extends down through the opening 38 of the bedding plate 24. The hook 40 is in the unlocked position, i.e. it is outside the eyelet 36.

Angle $\alpha$ is equal to $\alpha 1$ and angle $\beta$ is equal to $\beta 1$. Angle $\alpha 1$ is significantly larger than angle $\beta 1$.

The hook 40 is biassed against the pin 76 by the spring 79. Furthermore, the hook 40 is held in its radially outer position by the Belleville washers 70. The telescopic arm 90 is extended and is in the upper position.

In order to lock the roof arch 8 onto the frame 4, the handle 98 is pushed downwards, in a clockwise direction in FIG. 3, as indicated by arrow F. Consequently, the lever 80 drives the links 50 in a clockwise direction so that the third axis A3 is driven down along an arc C in a clockwise direction about the second axis A2. During this motion, the angles $\alpha$ and $\beta$ decrease, i.e. the extension 44 is displaced away from the plate 24 and moved into line with the direction D.

Since the length l of the hook is greater than the distance $d_1$, the distance of the eyelet 36 from the axis A3 is over-compensated by the tilting action of the hook.

During an initial stage, an effective motion with a component directed towards the eyelet 36 in direction D is therefore imparted to the hook 40. During this stage, the hook 40 is guided by the pin 76 and by the spring 79.

Figure 4:
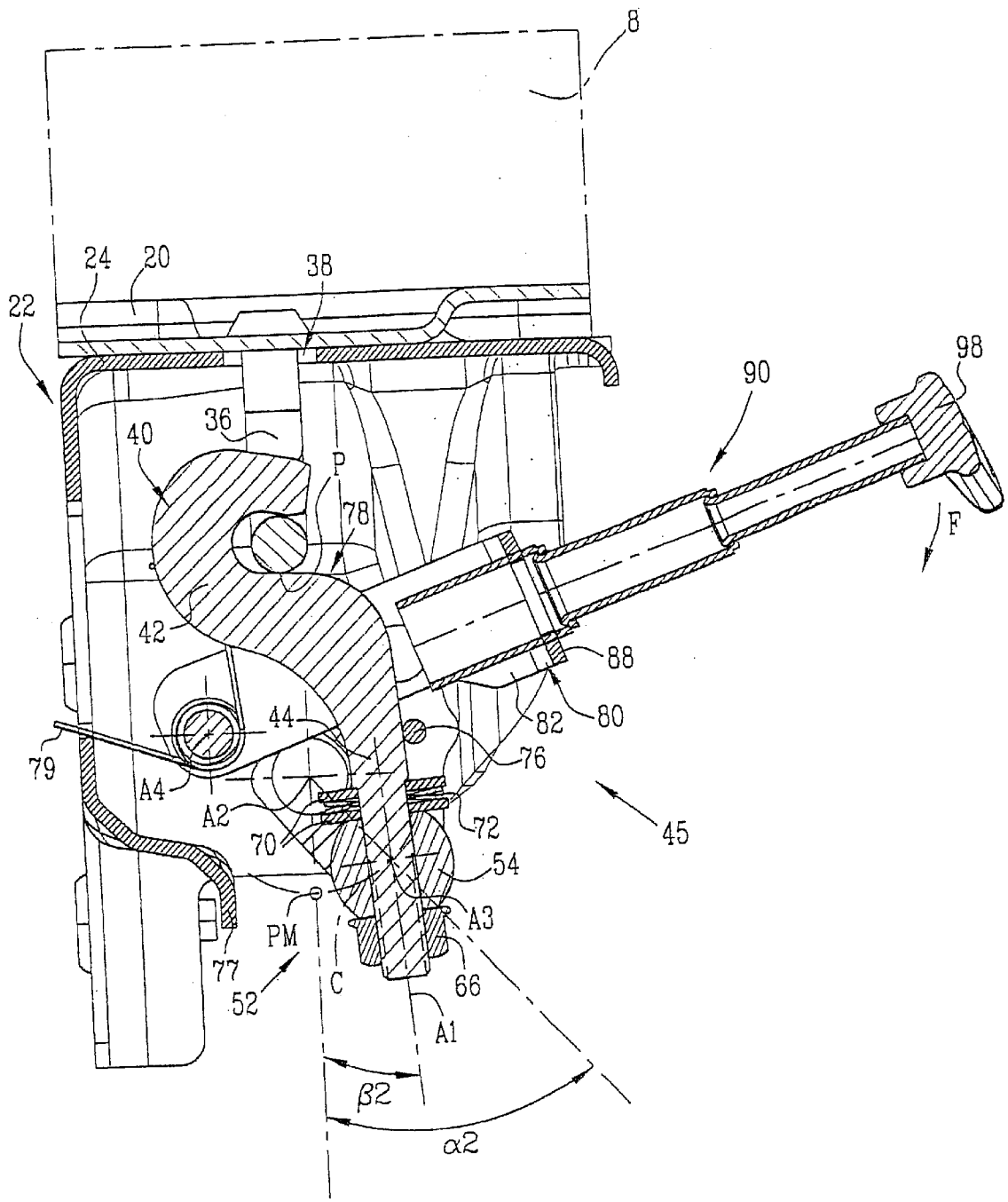
FIG. 4 is a view of the unit illustrated in FIG. 2 in an intermediate configuration.

The displacement of the lever 80 continues as far as an intermediate position, in which the two axes A2, A3 subtend an angle $\alpha 2$ with the direction D. In this position, the cam surface 78 comes into contact with the bottom surface of the eyelet 36 at a point P, as illustrated in FIG. 4, and the pin 76 is moved apart from the hook. From this position, the position of the hook 40 and its inclination $\beta 2$ are determined by the third axis A3 and the point of contact P between the cam surface 78 and the eyelet 36. Because the hook 40 is guided in this "floating" arrangement, any positioning errors of the eyelet 36 relative to the hook 40 are compensated.

As the displacement of the hook 40 under the action of the lever 80 continues, the radial adjusting device 52 enables portion 42 of the hook 40 to be displaced relative to the axis A3, radially towards this axis, under the action of the eyelet 36 acting on the cam surface 78 and opposing the Belleville washers 70. The hook 40 is prevented from jamming or interfering with the eyelet 36 because the cam surface 78 is continuously biassed against the eyelet 36.

The hook 40 then tilts into a position in which the axis A1 extends in the direction D. A tilting motion beyond this position biases portion 42 of the hook away from the bedding plate 24, thereby biassing the plate 20 against the latter.

The link 50 then swings into a dead centre position, in which the third axis A3 coincides with an axis PM and is disposed facing the eyelet 36 on the side opposite the second axis A2. In this position, the two axes A2, A3 define a plane extending parallel with the direction D.

Finally, the link 50 swivels into its locking position, beyond the dead centre position PM. The hook bearing 54 then moves to bear on the tab 77 forming a stop. The fact that the axis A3 is closer to plate 24 once again when the dead centre point PM has been crossed is over-compensated by a tilting motion of the hook 40 by an angle $\beta 3$. The eyelet 36 is therefore biassed downwards away from the plate 24, locking the mounting plate 20 against the bedding plate 24 (FIG. 4).

It should be pointed out that because the axes A2 and A4 do not merge, the swivelling action of the links 50 is reduced relative to the swivelling action of the lever 80. In the embodiment illustrated here, the lever 80 swivels by 40° imparting a swivelling motion of approximately $\alpha_2+\alpha_3=30°$ to the links 50. Consequently, relatively little force is needed to operate the linking unit.

Furthermore, the end branch of the crook-shaped portion 42 of the hook 40 covering the eyelet 36 may be long, which means that the eyelet 36 is covered to a large degree by the portion 42 of the hook 40. As a result, the linking unit 10 is reliably secured against any inadvertent release of the roof arch 8.

Furthermore, the radial adjusting device 52 eliminates any clearance between the hook 40 and the eyelet 36 in the locked position.

It should also be pointed out that the device proposed by the invention is simple in terms of construction and hence inexpensive.

What is claimed is:

1. Releasable unit for linking a first detachable structural element to a second structural element of a motor vehicle, the unit comprising:

a first and a second support element designed to be fixed respectively to the first and the second structural elements and to be applied one against the other when the two structural elements are linked, said first support element having a catch element;

a hook having a portion which co-operates with the catch element and being joined, to said second support element, this hook being displaceable relative to this second support element;

means for controlling the hook, these control means having guide means for guiding the hook between a locked position, in which the hook is engaged in the catch element, and an unlocked position in which the book is released from the catch element, the guide means being designed to bias the two support elements one against the other when the hook is fully displaced into its locked position, the guide means of the hook having a link mounted so as to articulate relative to said second support element about a first axis (A2) and on which the hook is articulated about a second axis (A3), the two axes (A2, A3) being mutually parallel and perpendicular to a direction of displacement (D), wherein the second axis (A3) is located on either side of a dead centre point (PM) when the hook is in its locked position, respectively in its unlocked position, the dead centre being disposed substantially opposite said first axis (A2) relative to the catch element.

2. Unit as claimed in claim 1, wherein the distance (l) between the second axis (A3) and said co-operating portion is significantly greater than the distance ($d_1$) between the two axes (A2, A3).

3. Unit as claimed in claim 1, wherein the guide means have checking means for stopping the hook, these stopping means preventing the hook from tilting towards its locked position when it is substantially in its unlocked position.

4. Unit as claimed in claim 3, wherein the checking means comprise a displaceable stop borne by the link, against which stop the hook is applied, at least when it is substantially in its unlocked position.

5. Unit as claimed in claim 4, wherein the guide means comprise a surface disposed on the hook forming a cam and designed to co-operate with the catch element when the hook is displaced from its unlocked position into its locked position.

6. Unit as claimed in claim 5, wherein the hook is designed to be applied against the displaceable stop between its unlocked position and an intermediate position where the hook and the catch element come in contact, whereas it is designed to co-operate with the cam surface between its intermediate position and its locked position.

7. Unit as claimed in claim 1, wherein the control means have a resilient element, in particular a spring, which biases the hook towards its locked position.

8. Unit as claimed in claim 1, wherein when the hook is disposed in an intermediate position with the hook and the catch element in contact, the second axis (A3) is located between the dead centre point and the position it assumes when the hook is in the unlocked position.

9. Unit as claimed in claim 1, wherein the control means additionally have driving means for driving the hook between its two unlocked and locked positions, and the driving means comprise an actuating lever of the link, mounted so as to articulate relative to said second support about a third axis (A4) extending parallel with said first (A2) and second (A3) axes, and the actuating lever is linked to the link by reducing means designed to reduce rotation of the lever relative to the link.

10. Unit as claimed in claim 9, wherein the reducing means comprise said third axis (A4), which is at a distance from said first (A2) and second (A3) axes, and these means have a guide aperture provided in one of the actuating lever or link components, as well as a stub co-operating with the guide aperture and fixed to the other of the actuating lever or link components.

11. Unit as claimed in claim 9, wherein the driving means have a telescopic arm fixed to the actuating lever.

12. Unit as claimed in claim 1, wherein the hook is linked to the link by means for adjusting the radial position relative to said second axis (A3).

13. Unit as claimed in claim 12, wherein the hook is radially displaceable relative to said second axis (A2) between radially outer and inner positions of the cooperating portion and the means for adjusting the radial position have a stop for adjusting the outer position and resilient means biassing the hook into its outer position.

14. Unit as claimed in claim 1, further comprising means for positioning said two support elements relative to one another in a plane substantially perpendicular to the direction of displacement (D) when the link is established.

15. Unit as claimed in any claim 1, wherein the catch element is a catch loop.

16. Motor vehicle having a frame as a first structural element and a roof arch as a second structural element, wherein the roof arch is joined to the frame by a releasable linking unit comprising:

a first and a second support element designed to be fixed respectively to the first and the second structural elements and to be applied one against the other when the two structural elements are linked, said first support element having a catch element;

a hook having a portion which co-operates with the catch element and being joined to said second support element, this hook being displaceable relative to this second support element;

means for controlling the hook, these control means having guide means for guiding the hook between a locked position, in which the hook is engaged in the catch element, and an unlocked position in which the hook is released from the catch element, the guide means being designed to bias the two support elements one against the other when the hook is fully displaced into its locked position, the guide means of the hook having a link mounted so as to articulate relative to said second support element about a first axis (A2) and on which the hook is articulated about a second axis (A3) a the two axes (A2, A3) being mutually parallel and perpendicular to a direction of displacement CD), wherein the second axis (A3) is located on either side of a dead centre point (PM) when the hook is in its locked position, respectively in its unlocked position, the dead centre being disposed substantially opposite said first axis (A2) relative to the catch element.

* * * * *